Aug. 21, 1962  A. X. WIDMER  3,050,673
VOLTAGE HOLDING CIRCUIT
Filed Oct. 14, 1960  2 Sheets-Sheet 1

INVENTOR
ALBERT X. WIDMER

BY Delbert C. Thomas

ATTORNEY

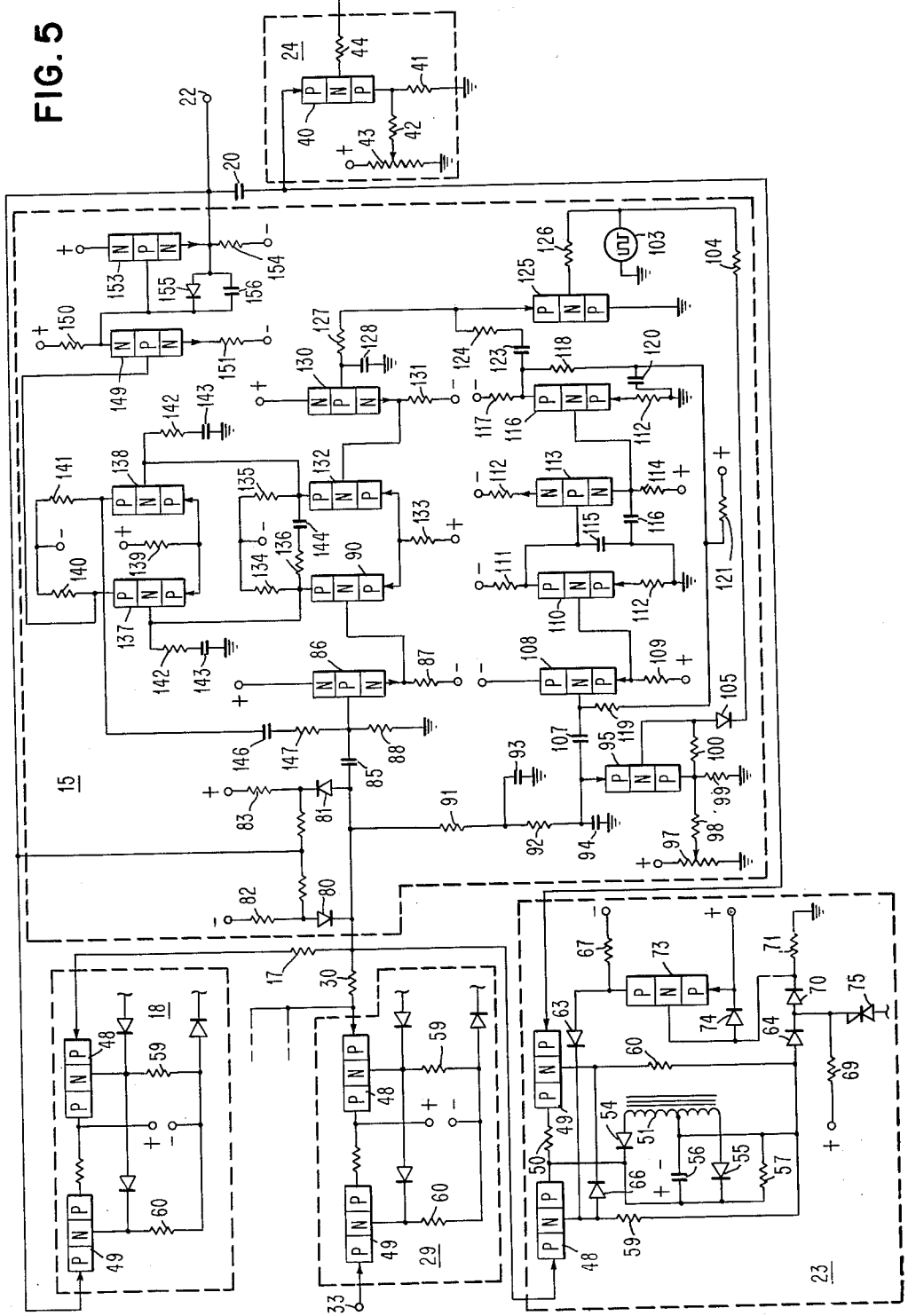

3,050,673
VOLTAGE HOLDING CIRCUIT
Albert X. Widmer, Peekskill, N.Y., assignor to International Business Machines Corporation, New York, N.Y., a corporation of New York
Filed Oct. 14, 1960, Ser. No. 62,576
3 Claims. (Cl. 320—1)

This invention relates to an electronic voltage transmission and storage device and more particularly to a device which will maintain an output voltage equal to an input voltage and can be converted to store a selected input voltage for use at a later time.

In analog to digital converters, it is essential that the analog input to the converter not change appreciably during the converting interval. Where the analog input varies relatively slowly, a direct connection of the input to the converter is satisfactory but for analog inputs which may have substantial variations during a conversion interval or where a plurality of analog inputs are to be multiplexed into a single converter, it is desirable to interpose a storage device to maintain a constant input voltage to the converter. Such a storage device should, for maximum efficiency, have a fast response time, follow the input closely, and be switchable to a storage condition without output transients so that the conversion cycle may follow without delay. Voltage storage devices for such purposes are known but have been generally unsatisfactory since they are slow, not as accurate as required and are subject to switching transients which slow down system operating speed.

It is then an object of this invention to provide an analog storage device which is fast, accurate and maintains its output without objectionable transient signals.

It is also an object to provide an electronic transmission and storage device which can maintain an output voltage equal to an input voltage and can be switched to maintain its output at the input voltage existing when the storage device is switched.

A further object is the provision of a voltage responsive device which may be switched from an input following state to a storage state without introducing a transient response to its output voltage.

A still further object is the provision of such a storage device which will be fast acting and accurate in operation without instability.

The foregoing and other objects, features and advantages of the invention will be apparent from the following more particular description of a preferred embodiment of the invention, as illustrated in the accompanying drawings:

In the drawings:

FIGURE 5 is a detailed circuit diagram of the structure of FIGURE 1.

In general, this invention is based on a stable high-gain D.C. amplifier which has an amplification of $10^5$ or more for D.C. with the amplification dropping at a nearly constant rate over the frequency range from D.C. to several hundred kilocycles. By adding a feedback circuit from the amplifier output to its input, the amplifier gain for D.C. may be reduced to very close to −1 so that the output voltage will, except for the reversal of polarity, be the same within about .01% as the input voltage. This output voltage may be used to charge a capacitor and when an applied input voltage is to be stored, both the input and feedback connections to the input are disconnected and the charged capacitor connected between the amplifier input and output. The amplifier will then act to hold its output voltage at the constant voltage set by the charged condenser. As the output voltage does not vary when there is a switch from the charging to the storing condition, no current readjustment is made within the amplifier and therefor no transient voltages appear on the output circuit and the stored voltage may be utilized immediately.

Figure 1:
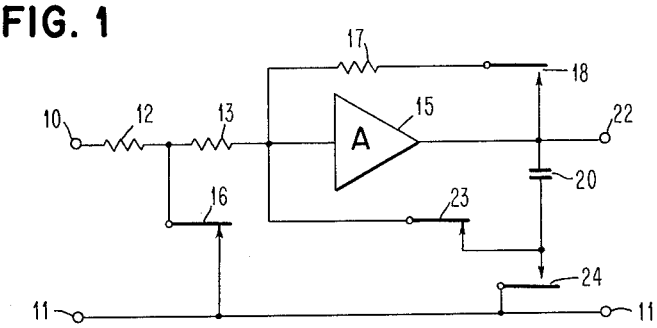
FIGURE 1 is a diagrammatic showing of the apparatus of the invention.

More specifically referring to FIGURE 1, an analog voltage to be stored is connected to input terminal 10 and to a common terminal 11. The input terminal 10 is connected through a pair of resistors 12 and 13 in series to the input terminal of a high gain D.C. amplifier 15. The center point of resistors 12 and 13 is connectable to common terminal 11 by a switch 16. A feed-back resistor 17, equal in value to the sum of resistors 12 and 13, and a switch 18 are in a series circuit between the input and the output of amplifier 15 and a capacitor 20 has one lead connected to amplifier output terminal 22 and the other lead connected to a pair of switches 23 and 24. The remaining lead of switch 23 is wired to the input of amplifier 15 and that of switch 24 is connected to the common terminal 11.

Figure 3:
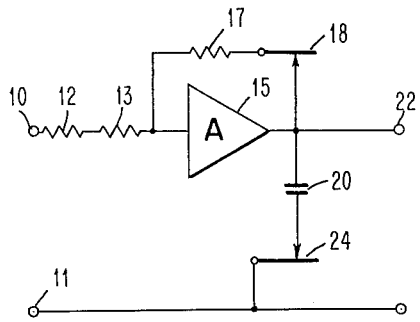
FIGURE 3 is a diagram showing the active elements and their connections when an analog voltage is applied to the input.

To charge capacitor 20 to the voltage of the analog input, switches 18 and 24 are closed and switches 16 and 23 are open giving an effective circuit as shown in FIGURE 3. The input voltage on terminal 10 will, through resistors 12 and 13, change the input level of amplifier 15 and result in a change of the output level of an opposite polarity to the input change. The output level is fed back through switch 18 and resistor 17 to the input to reduce the change in input voltage level. Since resistor 17 is equal to the sum of resistors 12 and 13, it will be apparent that if the output voltage of amplifier 15 is equal to the analog voltage at terminal 10, the amplifier input will be returned to zero. Actually, some voltage must remain at the input to maintain the output voltage but with an amplifier having a voltage gain of about $10^5$ or better, the output voltage will approach the input voltage within 0.01% or less which is sufficient for most applications. Capacitor 20 will be charged to the voltage of the output terminal at a rate dependent upon the amplifier characteristics.

Figure 2:
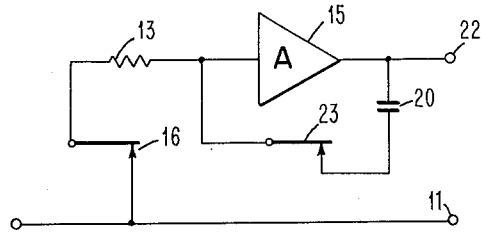
FIGURE 2 is a diagram showing the active elements of the invention when an input voltage is being stored.

When the input analog voltage is to be stored, switches 18 and 24 are opened and switches 16 and 23 are closed to change the circuit to the equivalent circuit of FIGURE 2. Here, the feed-back path through resistor 17 is open but capacitor 20 is connected in its place and the amplifier input is connected to the common terminal 11 through resistor 13. The charge on capacitor 20 tends to hold the amplifier input below the output level by the amount of the capacitor voltage which is the analog voltage as noted above. Any disturbance or variation in the output level will be immediately passed back through the capacitor 20 to the amplifier input to counteract the change so that the output voltage remains constant at its set level until switches 16, 18, 23 and 24 are returned to the charging condition.

Figure 4:
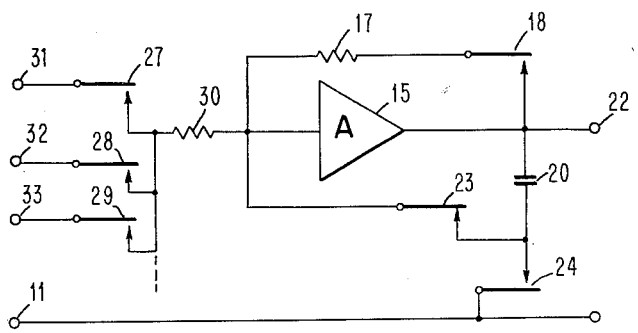
FIGURE 4 is a diagrammatic showing similar to FIGURE 1 but with the input connectable to any one of a plurality of analog voltages.

When the storage circuit is to be used for a plurality of input voltages successively, the input circuit is slightly modified to isolate the analog inputs from each other as shown in FIGURE 4. In this circuit, switch 16 is eliminated and a floating switch 27, 28, or 29 is connected between the amplifier input resistor 30, equivalent in value to resistors 12 and 13 of FIGURE 1, and one of the input terminals 31, 32, or 33. The switches 27, 28, and 29 are individually closed to charge capacitor 20 to the input voltage on its terminal 31, 32, or 33 and are opened at the same time switches 18, 23, and 24 are reversed to store the input voltage.

A detailed schematic diagram of a solid state amplifier and solid state switches which are suitable for use in voltage transmission and storing is set out in FIGURE 5 where the amplifier and switches corresponding to those of FIGURE 4 are enclosed in dotted line boxes and are given corresponding reference numerals. Two different types of transistor switches are required for the circuits of FIGURE 5 and these may be described as a ground switch and a floating switch. Switch 24 is representative of a ground switch as is switch 16 in FIGURE 1 and has the function of connecting a line to the ground potential. Switch 24 comprises a PNP transistor 40, preferably a low leakage silicon type, having its emitter terminal connected to the controlled circuit, in this case the lower lead of capacitor 20. The collector of transistor 40 is connected by a resistor 41 to ground and by a resistor 42 to the movable contact of a potentiometer 43 having its end terminals connected to ground and a positive voltage. Potentiometer 43 is set to provide a positive bias voltage on the order of a few millivolts at the collector to compensate for the D.C. offset voltage i.e., the voltage drop across the transistor during conduction. A control voltage, negative for a closed switch and positive for an open switch is applied to the base of transistor 40 through a resistor 44 to isolate the lower lead of capacitor from ground or to bring it to the ground level.

The remaining switches 18, 23, 27, 28, and 29 do not have either terminal connected to ground and are all the same although in FIGURE 5 only switch 23 is shown in detail. In switch 23, the two leads to be connected, here the lead from the junction of resistors 17 and 30 and the lower lead from capacitor 20 are connected to the emitters of two PNP transistors 48 and 49. Transistor 48 is preferably a low leakage silicon type while transistor 49 may be a germanium type. A small resistor 50 connects the collectors of transistors 48 and 49 together and equalizes the D.C. offset voltages of the two transistors when they are of different types. Also connected to the collector of transistor 48 is the positive terminal of a D.C. voltage supply which may be a battery but is preferably a floating A.C. rectifier. As shown, a transformer secondary 51 has its two end terminals connected through similarly poled rectifiers 54 and 55 to the collector of transistor 48. The connection may be considered the positive terminal of the D.C. supply with the center tap of winding 51 being the negative lead. A capacitor 56 and a bleeder resistor 57 are connected in parallel between the positive terminal and the negative lead to smooth and regulate the rectified voltage. The negative lead is connected to the base of transistor 48 through a resistor 59 and to the base of transistor 49 by a resistor 60.

With the collectors of transistors 48 and 49 more positive than their bases, a collector to base current will flow and their emitter terminals will be within a few millivolts of the collector voltage. The emitter to collector voltages of the transistors are, in passing from one switch terminal to the other, in opposition to each other and including the voltage drop across resistor 50 are equal so that the two terminals are at the same voltage.

To open the switch 23, the bases of the PNP type transistors 48 and 49 are made more positive than both their emitters and collectors by applying across resistor 59 through diodes 63 and 64, a voltage substantially larger than the rectified voltage from transformer winding 51. Diode 66 connected between the bases of the transistors 48 and 49 will pass a positive voltage from diode 63 to the resistor 60. Normally diode 63 has its anode connected through resistor 67 to a negative voltage and the cathode of diode 64 is connected to a positive voltage tap on a voltage divider comprising a resistor 69, a diode 70, and a resistor 71. Both diodes have a reverse voltage applied thereto and are, in effect, open circuits. A control transistor 73 has its collector connected to the junction of diode 63 and resistor 67 and has its emitter supplied with a positive voltage. The base of transistor 73 is connected to the anode of a diode 74 whose cathode connects to the emitter of transistor 73 and the base is also connected to the junction of resistor 71 and diode 70. A Zener diode 75 is connected at one end to the anode of diode 70 and may have its other end connected to a source of control voltage to open the switch 23. When Zener diode 75 does not have its lower end connected, the voltage across resistor 71 is only slightly higher than the emitter supply voltage for transistor 73 and little current passes through the transistor. By connecting the lower end of diode 75 to a voltage low enough to cause the diode 75 to pass current, the voltage at the anode of diode 70 and at the base of transistor 73 may be lowered to cause the transistor 73 to pass enough current to raise its collector voltage to substantially the voltage of its emitter supply and more positive than the voltage now on the cathode of diode 64. The resulting voltage across resistors 59 and 60 due to the current through diodes 63, 64, and 66 is greater than the opposed rectified voltage from winding 51 and will back bias the transistors 48 and 49 to isolate one switch terminal from the other and thereby open the switch.

The amplifier 15 as shown in the embodiment of FIGURE 5, has a high gain for D.C. signals and a response to several hundred kilocycles so that it has very good stability without drift for D.C. and can also respond rapidly to sudden changes in the input voltage. The input voltage to the amplifier 15 is taken from the junction of resistors 17 and 30 and is limited in its range by a pair of diodes 80 and 81, preferably of a low leakage silicon type, connected between the input lead and through resistors 82 and 83 to sources of negative and positive voltage respectively. Should the input voltage become more negative than the designed negative limit or more positive than the positive voltage limit, rectifier 80 or 81 respectively will be biased forwardly to conduct current and thus hold the input within the designed range.

Alternating signals in and above the audio frequencies will pass through a capacitor 85 to the base of an emitter follower transistor 86 having its emitter connected through a resistor 87 to a negative potential and its collector connected directly to a positive voltage. The base of transistor 86 is D.C. biased to ground through a resistor 88. The emitter of transistor 86 is connected directly to the base of a transistor 90 forming part of a differential amplifier circuit to be later described in detail.

The direct current and very low frequency signal components pass through a chopper stabilized D.C. amplifier section. These signals pass from the input through a pair of low pass filters comprised of resistors 91 and 92 and capacitors 93 and 94 to the emitter of a transistor 95. Transistor 95 acts as a switch similar to switch 24 to alternately connect the input through the filters to ground or to permit it to swing to the input voltage. Potentiometer 97, and resistors 98 and 99 connected to the collector act to compensate for the D.C. offset of transistor 95 as described above with respect to transistor 40 of switch 24 and resistor 100 connected between the base and collector of transistor 95 provides the small D.C. bias to hold the transistor non-conducting in the absence of a negative signal on the base. A control signal is applied to the base of transistor 95 by a generator 103 producing a substantially square wave A.C. signal, the negative parts of which pass through a resistor 104 and a diode 105 to the transistor base so that the input line to the emitter of transistor 95 is effectively grounded during the negative part of the signal. Generator 103 is preferably a multivibrator type oscillator having a frequency of about 1200 cycles per second and with the two internal feed-back paths having different time constants so that the positive part of the output wave is longer than the negative part. This will provide a longer time for charging capacitor 94 through resistors 91 and 92 than the comparatively short time needed to discharge it through transistor 95.

The chopped input voltage on the emitter of transistor 95 passes through capacitor 107 to the base of an emitter follower transistor 108 having a resistor 109 connected between its emitter and a positive voltage and its collector connected directly to a negative voltage. The signal at the emitter of transistor 108 is applied directly to the base of a transistor 110 which has its emitter grounded and a resistor 111 in its collector circuit. The collector of transistor 110 connects to the base of a transistor 113 having its emitter at a negative voltage and a resistor 114 in its collector circuit. Capacitors 115 and 116 between the collectors of transistors 110 and 113 respectively and ground, bypass noise and other high frequency components of the output signals. The signal at the collector of transistor 113 is applied directly to the base of a transistor 116 whose emitter is grounded and whose collector circuit includes a resistor 117. A small resistor 112 is inserted in the emitter leads for transistors 110, 113, and 116 to limit the transistor currents to a safe value if the amplifier goes out of its linear range. A feed back path comprising two resistors 118 and 119 in series with a capacitor 120 from their mid-point to ground and a resistor 121 from the mid-point to a positive bias voltage, is connected between the collector of transistor 116 and the base of transistor 108.

The collector of transistor 116 is connected through capacitor 123 and resistor 124 to the emitter of a transistor 125 which acts as a switch similar to transistors 40 and 95. As transistor 125 is preferably a germanium type, its D.C. offset voltage is negligible and need not be compensated. The collector of transistor 125 is grounded and its base is connected through a resistor 126 to the output of generator 103. Also connected to the emitter of transistor 125 is one end of a resistor 127 with a large capacitor 128 between the other end of resistor 127 and ground. Since there are three amplifying stages interposed, the emitter voltages of transistors 95 and 125 will be of opposite polarity and the voltage at capacitor 128 will be opposite in polarity to the input signal and linearly related thereto.

The voltage on capacitor 128 is applied to the base of an emitter follower transistor 130 which has its collector connected directly to a positive supply and its emitter current passing through a resistor 131 to a negative supply. The emitter voltage is applied to the base of a transistor 132 similar to transistor 90. Transistors 90 and 132 are connected as a differential amplifier with a common emitter resistor 133 and individual collector resistors 134 and 135 respectively. A filter composed of a resistor 136 and a capacitor 144 in series is connected between the collectors of the transistors 90 and 132 to bypass a part of the high frequency signal. Each transistor 90 and 132 has its collector directly connected to the base of one of a pair of transistors 137 and 138 forming a second differential amplifier with a common emitter resistor 139 and individual collector resistors 140 and 141 respectively. The base of each transistor 137, 138 is bypassed to ground through a filter composed of a resistor 142 and a capacitor 143 in series to further eliminate high frequency signals while the collector of transistor 138 connects through the feed back circuit of capacitor 146 and series resistor 147 to the base of transistor 86.

The collector of transistor 137 is connected directly to the base of a transistor 149 having a collector resistor 150 and an emitter resistor 151. The collector of transistor 149 directly controls the base of an emitter follower transistor 153 having an emitter resistor 154. The emitter of transistor 153 is connected to the output terminal 22 and is also connected through a parallel diode 155 and capacitor 156 back to its base to increase the maximum negative output current.

A chopper stabilized amplifier of this type has been found to have low drift and almost perfect linearity in the range of minus 10 volts to plus 10 volts. The combination of high and low frequency input channels gives a good response time of a few microseconds for an output rise to 99% of a 10 volt step pulse at the input without overshoot or oscillation.

While the invention has been particularly shown and described with reference to a preferred embodiment thereof, it will be understood by those skilled in the art that various changes in form and details may be made therein without departing from the spirit and scope of the invention.

What is claimed is:

1. A voltage transmitting and retaining device comprising an amplifier having an input and an output, a pair of resistors each connected at one end to said amplifier input, a first switch means to connect the other end of one resistor to a voltage input terminal, a second switch means to connect the other end of the other of said resistors to said amplifier output, a capacitor having one lead connected to said output terminal and a pair of switches alternately operable to connect the other lead of said capacitor to a common voltage reference or to connect said other lead to said amplifier input and means to open said first and second switch means when said other capacitor lead is connected to said amplifier input.

2. A voltage transmitting and retaining device including a D.C. amplifier having an input and an output, a first resistor connected between the source of a voltage to be transmitted and said amplifier input, a second resistance connected between said input and said output and a capacitor connected between said output and a zero voltage conductor whereby said output will be energized to and said capacitor will be charged to the voltage of said source, means to interrupt the circuits through said resistors and between said capacitor and said conductor, and means operable simultaneously with operation of said interrupting means to connect said charged capacitor between said amplifier input and said output whereby said output will be retained energized to the interrupted voltage of the source.

3. A voltage transmitting and retaining device comprising a D.C. amplifier having an input and an output, a pair of equal resistors each having one end connected to said amplifier input, a first electronic switch connecting the other end of one of said resistors to a source of a voltage to be transmitted, a second electronic switch connecting the other end of the second of said resistors to the output of said amplifier whereby the voltage at said output is maintained substantially equal to the voltage of said source, a capacitor having one terminal connected to said output, a third and a fourth electronic switch for connecting the other terminal of said capacitor to a zero voltage conductor or for connecting said other terminal to the input of said amplifier and switch control means to close said first, second, and third switches to charge said capacitor to the voltage of said source or to close said fourth switch to maintain the output voltage of said amplifier at the voltage of said charged capacitor.

References Cited in the file of this patent

UNITED STATES PATENTS

| | | |
|---|---|---|
| 2,843,736 | Huntley | July 15, 1958 |
| 2,914,750 | Cook | Nov. 24, 1959 |